(12) United States Patent
Frohlund

(10) Patent No.: US 6,493,542 B1
(45) Date of Patent: Dec. 10, 2002

(54) ARRANGEMENT AT A MOBILE TELEPHONE

(75) Inventor: Stig Frohlund, Hässleholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/527,057

(22) Filed: Mar. 16, 2000

(51) Int. Cl.$^7$ .............................. H04B 1/38; E05D 11/00
(52) U.S. Cl. .................. 455/90; 455/550; 455/575; 379/433.13; 16/330; 16/303
(58) Field of Search .................... 455/90, 550, 575; 379/433.13; 361/814; 439/11, 31; 16/221, 223, 308, 303, 330

(56) References Cited

U.S. PATENT DOCUMENTS

| | | | |
|---|---|---|---|
| 5,640,690 A | * 6/1997 | Kudrna | ................. 455/575 |
| 5,649,309 A |   7/1997 | Wilcox et al. | |
| 5,732,135 A | * 3/1998 | Weadon et al. | ........ 379/433.13 |
| 5,987,122 A | * 11/1999 | Daffara et al. | ......... 379/433.13 |
| 6,104,621 A | * 8/2000 | Weadon et al. | ............. 361/814 |
| 6,321,415 B1 | * 11/2001 | Frohlund | ..................... 16/330 |

FOREIGN PATENT DOCUMENTS

EP       0756406       1/1997

\* cited by examiner

Primary Examiner—Edward F. Urban
Assistant Examiner—Erika A. Gray
(74) Attorney, Agent, or Firm—Nixon & Vanderhye, P.C.

(57) ABSTRACT

The present invention relates to an arrangement at a cellular mobile telephone apparatus (1), comprising a protective hatch or flip (2) pivotably arranged on a housing (3) of said apparatus (1). The flip (2) is pivotable around an axis and arranged to at option physically cover at least parts of a front surface (5) on said apparatus (1), said axle comprises at least one active hinge means arranged in a cavity (7) each, at the end of said housing (3), of which at least one of said hinge means is aimed to positively urge said flip (2) to take a certain predetermined open position, when released. The active hinge means (6) comprise a shaft arrangement, colinear with said axis, comprising at least one unit (6) built from an end piece (9) and an elongated core (10) fixedly connected thereto, around which core (10) a torsion spring (11) is arranged. The spring (11) has at its respective ends fingers (12, 13) as counteracting parts for acting against a limit stop ridge (29) in the housing, for allowing said spring (11) to reach an equilibrium position corresponding to an open flip (2) at 120–170° from said closed position.

9 Claims, 4 Drawing Sheets

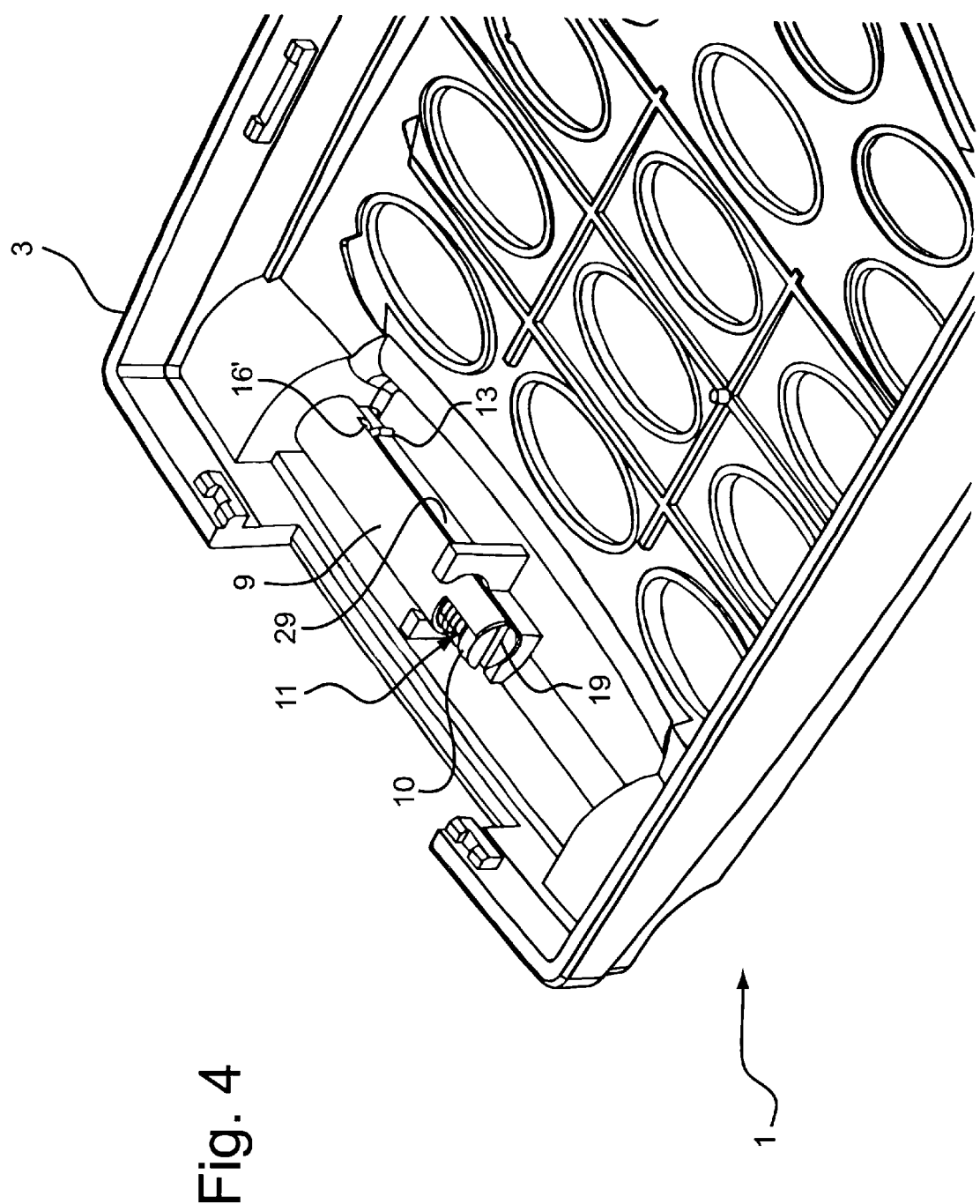

ARRANGEMENT AT A MOBILE TELEPHONE

TECHNICAL FIELD OF THE INVENTION

The present invention relates to an arrangement at a cellular mobile telephone apparatus, comprising a protective hatch or flip pivotably arranged on a housing of said apparatus, said flip being pivotable around an axis and arranged at option to physically cover at least parts of a front surface on said apparatus, said axle comprises at least one active hinge means arranged in a cavity each, at the end of said housing, of which at least one of said hinge means is aimed to positively urge said flip to take a certain predetermined open position, when released.

DESCRIPTION OF THE PRIOR ART

Mobile telephones provided with such a flip or a hatch, have for covering a key pad on such telephones been used by most manufacturers for some years. The main purpose with such a flip—being to protect parts of a front surface of such a telephone, most often said keypad, and in that case protecting it from inadvertent manipulation—has by other manufacturers been tackled electronically through the use of key pad locks, being activated/deactivated by inserting a certain code for disabling/enabling the keypad.

Mobile telephones have by now become so small that it is almost a must to use such a flip for establishing the right distance between the earpiece and a sound receiving means, namely a sound channel leading to a microphone or the microphone itself. For obtaining the best possible fidelity of the sound registered by said microphone, it should preferably be placed in said flip.

It is for practical reasons desired that the flip on such a small mobile telephone should be made positively openable by for instance pressing a button on the side of the mobile telephone and that thereafter the flip be kept in a certain angular use-position. For geometrical reasons this can not be achieved by a conventional cam follower mechanism in the hinge means, frequently used until now.

Neither can such cam followers both establish the positions of the flip mentioned above and achieve an override function. An override function is a function enabling the flip in its open position to be turned beyond its speaking or use position, being about 160° separated from the closed position, up to maybe 180°, when e.g. laid upside down on a table and pushed down unintentionally.

It is furthermore undesirable to have a design that results in residue axial stress on ears of the housing or the flip of such a telephone, which is the case when a cam-follower mechanism is used and which in the long run may cause endurance failures. Consequently other solutions (often more complicated than previous ones for obtaining almost the same functionality), like the one according to U.S. Pat. No. 5,649,309, for achieving the same function has seen the light of day. According to said patent an axle for a flip has two active hinges, the first one for keeping said flip in a closed position during pre-stressing of a spring in the second active hinge to a predetermined extent, and the second one supposed to after release of the urge from the first active hinge, pivot the flip into a predetermined potential speaking position, in which it is yieldably held by the first active hinge. The complexity of this and other solutions has given rise to inventive activity with the aim of achieving a somewhat simpler, implicitly thereby also more cost effective solution, which due to its simplicity also is better suited for automatic assembly.

SUMMARY OF THE INVENTION

It is therefore an object of the present invention to provide a mobile telephone apparatus with improved means for positively opening such a flip.

To meet this object said active hinge means comprise a shaft arrangement, colinear with said axis, comprising at least one unit built from an end piece and an elongated core fixedly connected thereto, around which core a torsion spring is arranged, said spring having at its respective ends fingers as counteracting parts for acting against a limit stop ridge in the housing, for allowing said spring to reach-an equilibrium position corresponding to an open flip (2) at 120–170° from said closed position.

By this arrangement no axial force is exerted by said spring, which is enclosed in the arrangement and will therefore not affect the flip in any undesired way and will consequently only urge the flip towards an open use position. This gives the advantage that it eliminates the risk for fatigue cracking of the outer parts of the flip due to a constant tension from said spring. In the inverted case, in which ears for the hinge function are arranged only on the housing, the same goes for these ears.

Another object with the present invention is to simultaneously achieve an override function, i.e. a function that with the flip in an open position makes it possible to over-pivot, which for example takes care of the situation when the telephone is laid upside down and pressed upon without destroying essential parts, as also mentioned above.

According to an embodiment of the invention an end piece and a core together surrounds the torsional spring, giving the advantage that either one or the other ear of the spring is fixed while the other is pivoted under the indirect influence of said flip.

Almost unexpectectedly an override function of a most simple construction is achieved by letting one of the fingers of said spring be actuated by the flip when overridden, thus affecting said equilibrium position of the spring.

BRIEF DESCRIPTION OF THE DRAWINGS

Below a preferred embodiment of the invention will be described more in detail with reference to the enclosed drawings, in which, FIG. 4 shows a partial perspective view analogous to FIG. 3 with said active hinge unit inn its assembled state.

DETAILED DESCRIPTION OF THE INVENTION

For obtaining a better understanding of the invention and the details of the arrangement according thereto in the following the invention is described with reference to the above described sequence of consecutively arranged illustrations.

Figure 1:
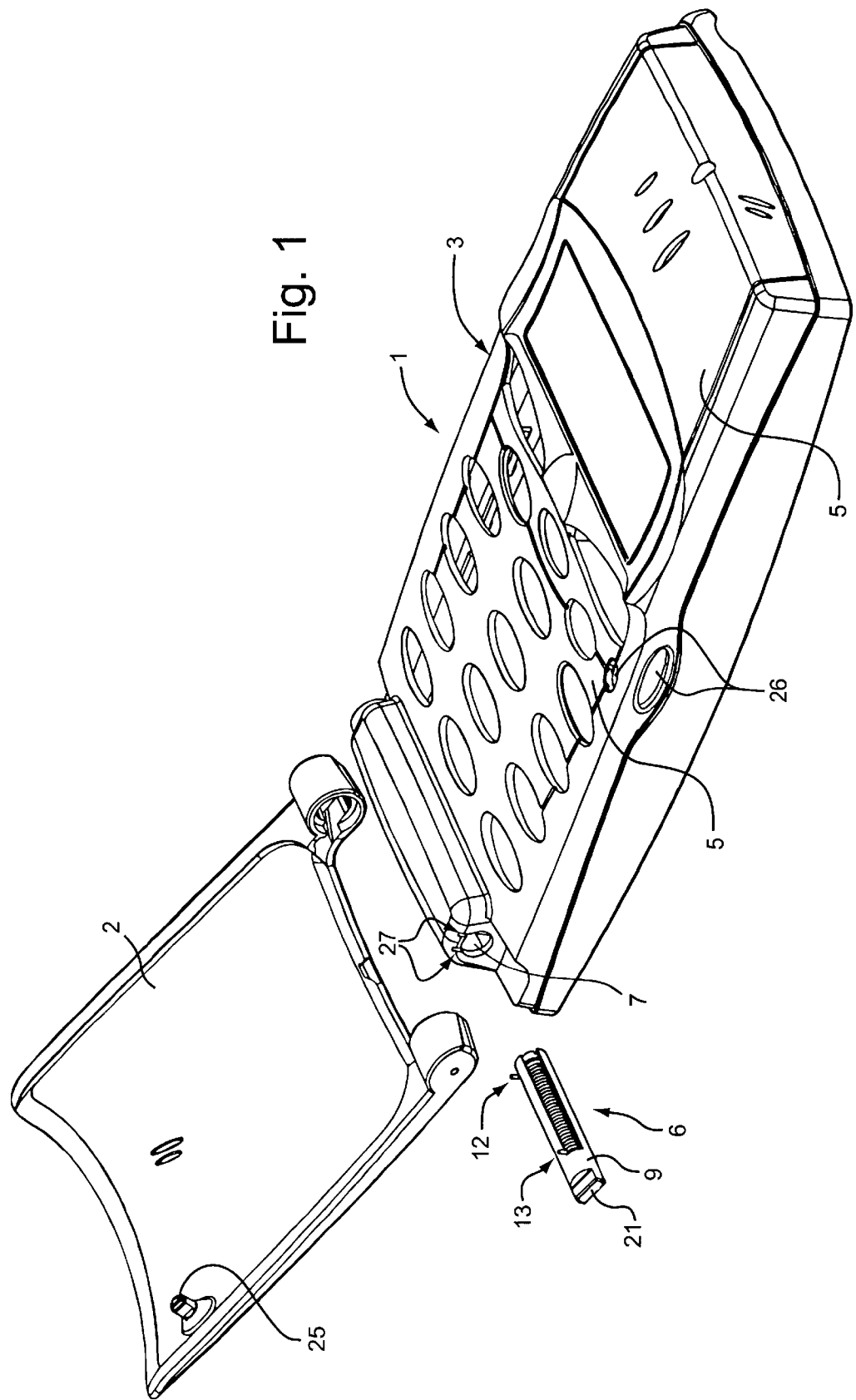
FIG. 1 shows an exploded perspective view of an upper housing of a mobile telephone together with a flip and an active hinge-unit.

According to FIG. 1 an exploded perspective view of an upper housing 3 of a mobile telephone apparatus 1 is shown together with a flip 2, covering parts of a front surface 5 of said housing 3 when in an assembled state. A dowel 25 is arranged on the flip 2 for cooperation with a locking arrangement(not shown), supposed to be manually operated, on the upper housing 3, parts of which locking arrangement can be seen as notches 26 in the housing. A hinge unit 6 is shown, aimed to be inserted in a cavity 7 in a lower part of said housing 3. In connection with the cavity 7 shown, also two slots 27 are shown, enabling the assembly insertion of the hinge unit into the housing 3.

Figure 2:
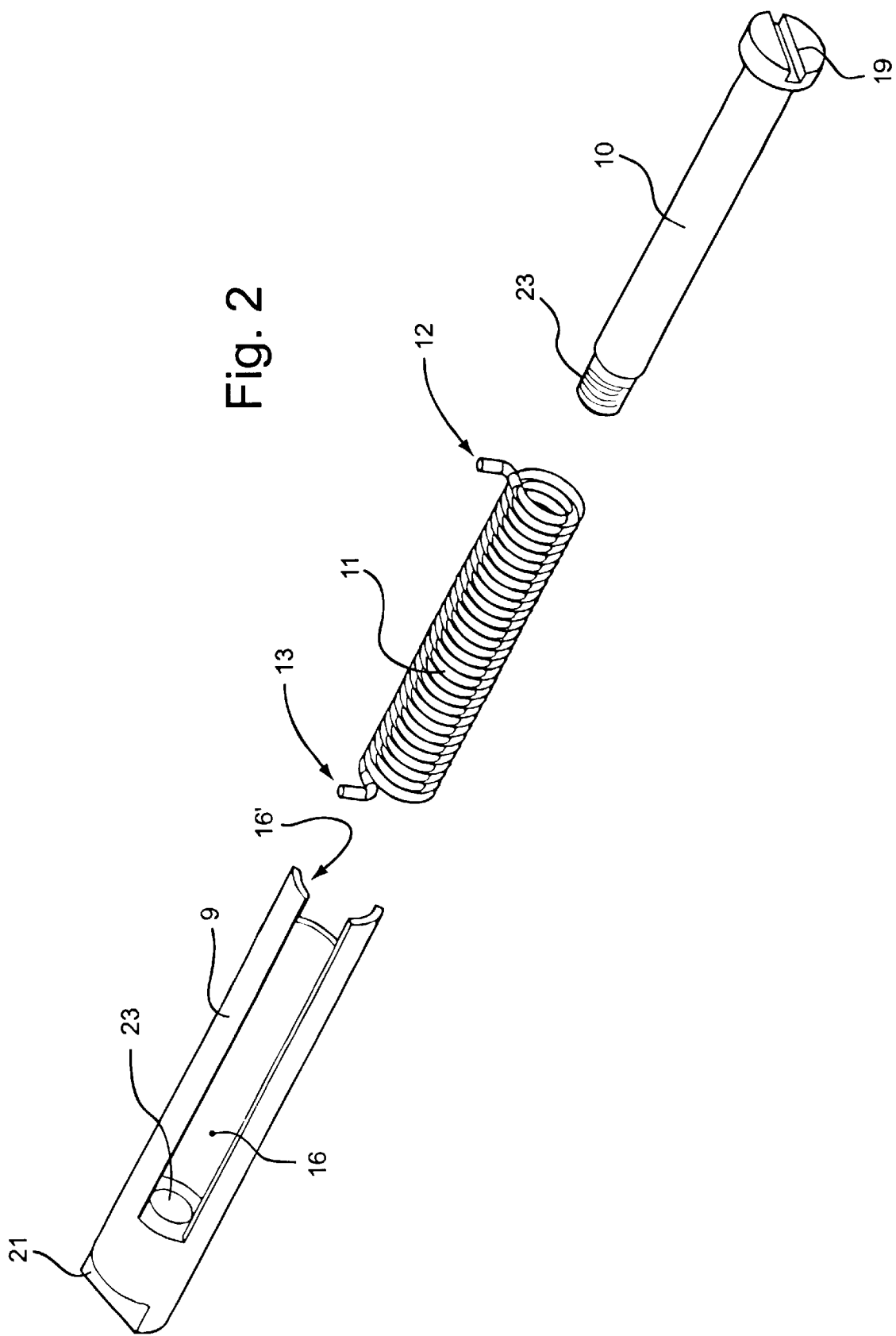
FIG. 2 shows an exploded perspective view of the parts of the active hinge-unit.

FIG. 2 in detail show the parts of said hinge unit 6, namely an end piece 9, a core 10 and a torsion spring 11, the latter meant to be interposed between the parts 9 and 10. The end piece has, partly for enabling the assembly thereof with the spring 11 and the core 10, two axial slots 16, 16' respectively. In this embodiment the angular extension of the slot 16 equals the most possible overturn for the flip on or around 30°, while the angular extension of the slot 16' equals the angular travel for the flip between a closed position and a normal open position. In this preferred embodiment, the core 10 is fixed to the end piece 9 by the use of a thread 23 on each of the parts 9 and 10. It is however obvious to the skilled person to use any other method for fixation of these parts, such as a snap fixation or simply a glueing. In this case however, when the unit 6 being tensioned with a proper/ correct momentum, the unit 6 is clear for insertion in its cavity 7, the location of which is better seen in FIG. 4, described below. The end piece also comprise a dowel 21 for its cooperation with an ear of the flip 2. Torsion spring 11 as mentioned above, comprise two fingers, an inner finger 12 and an outer finger 13 supposed to cooperate on the one hand with the end piece 9 and on the second hand with a ridge 29 (see FIG. 3) in the upper housing 3.

Figure 3:
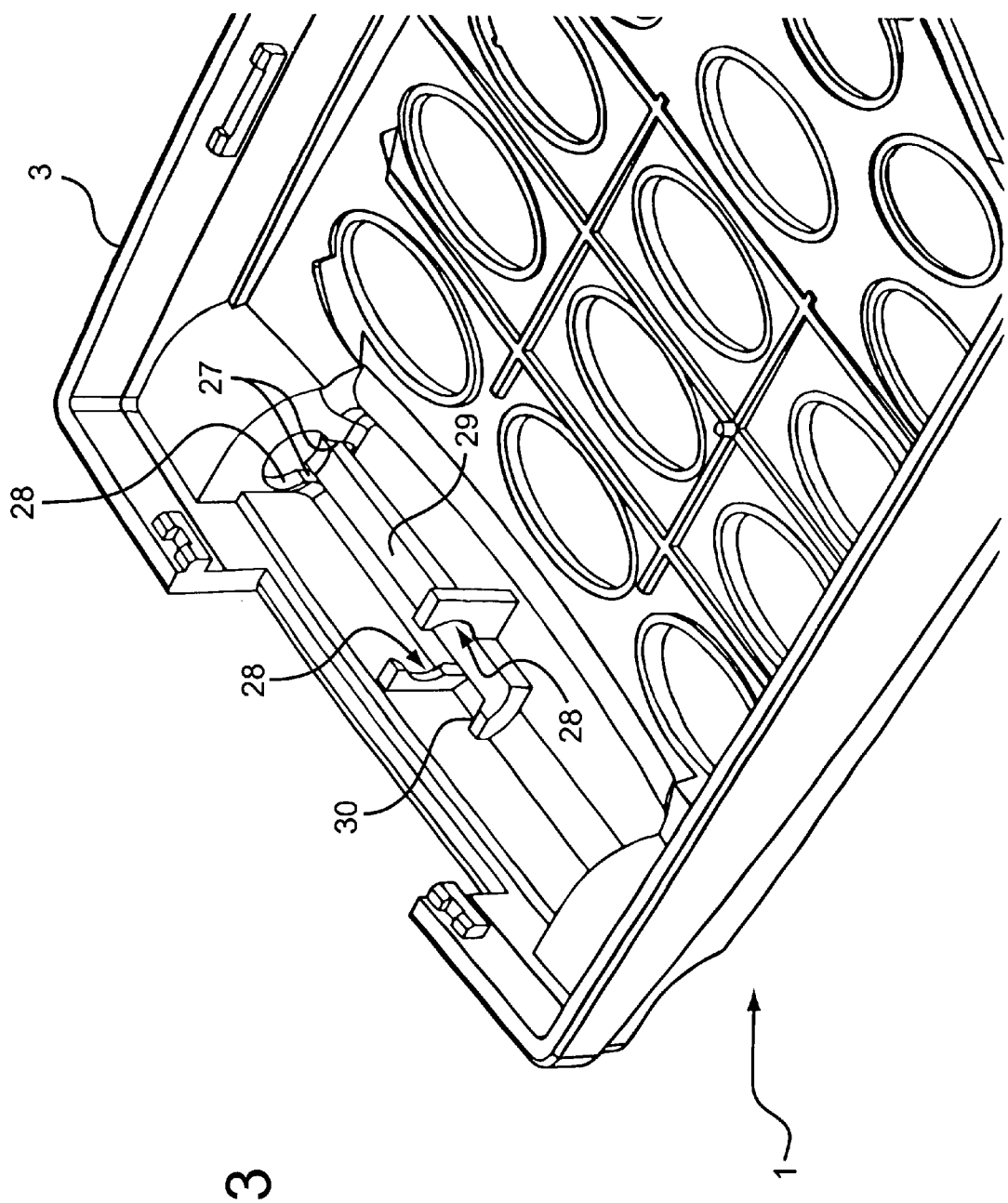
FIG. 3 shows a partial perspective view from a rear side of said upper housing on an enlarged scale.

According to FIG. 3, an enlarged perspective view of said upper housing is shown, in which the hinge unit 6 is to be arranged. This figure in detail elucidates the design of the interior of the cavity 7. As mentioned above the opening to the cavity 7 has two slots enabling the assembly of the upper housing 3 and the unit 6. The cavity comprise bearing surfaces 28 for cooperation with the end piece 9, The housing 3 also has a ridge 29 for cooperation with the fingers 12 and 13 of the spring. At its innermost end the ridge 29 has a more or less perpendicular extension 30 arranged for cooperation with the innermost finger 12 during assembly of the flip 2. This is made possible by allowing and enabling the spring to act as a compression spring to a very limited extent. When so doing, the innermost finger 12 rests against said perpendicular extension 30, in turn making it possible to first pre-assemble the non-active hinge-end of the flip 2 and thereafter press the dowel 21 wholly or partly flush with the housing 3 whereafter the active hinge-end of the flip is brougt into a correct position enabling release of the external pressure on the dowel 21.

FIG. 4 finally shows the arrangement according to the invention in an assembled condition with the exception that the flip 2 has been excluded. The unit 6 is shown oriented as if the flip 2 were in its normal open position, corresponding to an equilibrium position of the spring 11. The outermost finger 13 is shown resting in contact with or in the close vicinity of the ridge 29. The innermost finger 12 of the unit 6 is hidden behind the core 10 and the spring 11.

As is realised when observing FIGS. 3 and 4 the upper housing 3 contains a fairly large space in connection to the inner end of the unit 6. This is in partly used for cables necessary for a possible installation of a microphone in the flip 2. It might however be possible that parts of said space will be used for the arrangement of means for achieving a dampening function for the opening or the closing of the flip 2. For this purpose the innermost end of the core 10 has a slot 19, like a screw driver slot, for making a connection to such a damper unit possible.

What is claimed is:

1. Arrangement at a cellular mobile telephone apparatus, comprising a protective hatch or flip pivotably arranged on a housing of said apparatus, said flip being pivotable around an axis and arranged at option to physically cover at least parts of a front surface on said apparatus, said axle comprises at least one active hinge means arranged in a cavity each, at the end of said housing, of which at least one of said hinge means is aimed to positively urge said flip to take a certain predetermined open position, when released, wherein said active hinge means comprise a shaft arrangement, colinear with said axis, comprising at least one unit built from an end piece and an elongated core fixedly connected thereto, around which core a torsion spring is arranged, said spring having at its respective ends fingers as counteracting parts for acting against a limit stop ridge in the housing, for allowing said spring to reach an equilibrium position corresponding to an open flip at 120–170° from said closed position.

2. Arrangement according to claim 1 wherein said equilibrium position is located at 155°+/−5° from the optional closed flip position.

3. Arrangement according to claim 2, characterised in that a rotary oil or other damper unit is arranged close to the active hinge means, in which case said damper is rotationally driven by a driver slot at the inner end of the core.

4. Arrangement according to claim 2, characterised in that the end piece carries a driver to be connected to the flip for indirectly acting on the spring.

5. Arrangement according to claim 2, characterised in that the end piece and the core are connected to each other by the use of a thread.

6. Arrangement according to claim 1, wherein the end piece comprise two axial slots, both for transforming a movement in the flip, via said dowel in each possible direction into a torsional higher or lower stress in said spring.

7. Arrangement according to claim 6, wherein the other finger of the spring, also acting against the limit stop ridge of the housing, is for achieving a non-destructive override function for the flip, beyond said equilibrium position, so as to bring back the flip thereto after an override.

8. Arrangement according to claim 1, wherein one of said fingers of the spring, acting against the limit stop ridge of the housing, is for achieving an opening of said flip towards said equilibrium position, from a closed position thereof.

9. Arrangement according to claim 1, characterised in that it comprises a lock mechanism holding the flip in a closed position against the torsional force of the spring.

* * * * *